UNITED STATES PATENT OFFICE.

FRANK G. SLEMMER AND GEORGE O. CLARK, OF PHILADELPHIA, PA.

IMPROVEMENT IN THE MANUFACTURE OF LEATHER BELTING.

Specification forming part of Letters Patent No. 163,337, dated May 18, 1875; application filed March 29, 1875.

*To all whom it may concern:*

Be it known that we, FRANK G. SLEMMER and GEORGE O. CLARK, both of the city and county of Philadelphia, State of Pennsylvania, have invented a new and useful Improvement in the Manufacture of Leather Belting, of which the following is a specification:

This invention is an improvement on Letters Patent No. 133,698, granted to us December 10, 1872, in which canvas or other textile fabric, thoroughly saturated with cement, is introduced between two or more layers of leather.

The object of the present invention is to more effectually prevent the stretching of the belt while running.

It has been shown that canvas or other textile fabric may be used—canvas being the most preferable, as it possesses the greatest strength; but still it will stretch to a considerable extent when a strain is brought to bear upon it.

In our invention we soak the canvas in cement until it becomes thoroughly saturated, after which we stretch or expand it under a heavy strain, and allow it to remain in this state until the cement becomes hard and dry. The canvas being thus stretched or expanded to its greatest limit, and the cement allowed to dry, it will remain in this condition at all times without again contracting and expanding. The cement, acting in this case as a stiffening, destroys the pliability of the canvas.

What we claim as our invention is—

The within-described process of preparing canvas or other textile fabric for use in the manufacture of the leather belting as patented by us December 10, 1872—that is to say, by thoroughly saturating the material with cement, and stretching and drying it before introducing it between the leather—substantially as and for the purpose set forth.

FRANK G. SLEMMER.
GEORGE O. CLARK.

Witnesses:
   ISAAC R. OAKFORD,
   FRANCIS D. McGLENSEY.